United States Patent
Vehmas

(10) Patent No.: US 6,282,923 B1
(45) Date of Patent: Sep. 4, 2001

(54) HEATING GLASS SHEETS IN TEMPERING FURNACE

(75) Inventor: Jukka Vehmas, Tampere (FI)

(73) Assignee: Uniglass Engineering Oy, Tampere (FI)

( * ) Notice: Subject to any disclaimer, the term of this patent is extended or adjusted under 35 U.S.C. 154(b) by 0 days.

(21) Appl. No.: 09/194,193

(22) PCT Filed: May 21, 1997

(86) PCT No.: PCT/FI97/00303

§ 371 Date: Jan. 19, 1999

§ 102(e) Date: Jan. 19, 1999

(87) PCT Pub. No.: WO97/44283

PCT Pub. Date: Nov. 27, 1997

(30) Foreign Application Priority Data

May 22, 1996 (FI) ........................................ 962158

(51) Int. Cl.⁷ .................................................. C03B 27/044
(52) U.S. Cl. ........................ 65/114; 65/273; 65/350; 65/351; 65/355
(58) Field of Search ........................... 65/95, 114, 119, 65/273, 348, 349, 350, 351, 355; 432/144

(56) References Cited

U.S. PATENT DOCUMENTS

| | | | |
|---|---|---|---|
| 4,390,359 | * 6/1983 | Reunamaki | 65/114 |
| 4,505,671 | 3/1985 | McMaster | 432/144 |
| 4,529,380 | 7/1985 | McMaster | 432/144 |
| 4,681,616 | * 7/1987 | McMaster | 65/114 |
| 5,032,162 | * 7/1991 | Reunamaki | 65/348 |
| 5,057,138 | * 10/1991 | Vehmas et al. | 65/111 |
| 5,078,774 | * 1/1992 | Vehmas et al. | 65/118 |
| 5,368,624 | * 11/1994 | Lehto et al. | 65/29.19 |
| 5,647,882 | * 7/1997 | Thiessen | 65/348 |
| 5,735,924 | * 4/1998 | Kormanyos | 65/111 |

FOREIGN PATENT DOCUMENTS

| | | |
|---|---|---|
| 0416332 | 3/1991 | (EP) . |
| 62043 | 7/1982 | (FI) . |
| 83072 | 2/1991 | (FI) . |
| 86407 | 5/1992 | (FI) . |
| 97378 | 8/1996 | (FI) . |
| 2159145 | 11/1985 | (GB) . |
| 9803439 | 1/1998 | (WO) . |

* cited by examiner

Primary Examiner—Sean Vincent
(74) Attorney, Agent, or Firm—Ladas & Parry

(57) ABSTRACT

A method and an apparatus for heating glass sheets in a tempering furnace. The tempering furnace (1) includes rollers (3) for conveying and oscillating the glass sheets (4) during heating, and resistors (5, 6) for heating the glass sheets (4) from above and from below. The lower part of the tempering furnace (1) is cooled at the initial stage of the heating period, and the lower surfaces of the glass sheets (4) are heated at the final stage of the heating period by forced convection. This ensures good control over heat equalization in the tempering furnace (1), increases furnace power, prevents curving of the glass sheets (4), and also reduces heat shock from ceramic rollers at the initial heating stage.

18 Claims, 2 Drawing Sheets

HEATING GLASS SHEETS IN TEMPERING FURNACE

FIELD OF THE INVENTION

The invention relates to a method of heating glass sheets in a tempering furnace provided with rollers, in which method the glass sheets are led on a roller conveyer through the tempering furnace, the glass sheets being heated from above and from below, and the glass sheets being oscillated in a reciprocating manner on the rollers, and the lower part of the tempering furnace being cooled during the heating period.

The invention also relates to equipment for heating glass sheets in a tempering furnace provided with rollers, the equipment comprising a tempering furnace, means for heating the glass sheets from above and from below, horizontal rollers inside the tempering furnace which support a horizontal glass sheet and form its conveyor, the rollers being adapted to oscillate the glass sheet in a reciprocating manner during heating, and means for cooling the lower part of the tempering furnace.

BACKGROUND AND PRIOR ART

Current glass tempering machines employ what are known as oscillating roller furnaces in which glass is heated mainly by radiation. In the tempering process the temperature of the glass is increased above the softening point of glass in order to enable the glass to be tempered. Said temperature is between 610 and 625° C. depending on the thickness of the glass. The glass is then cooled at desired speed typically using forced convection whereby air jets are blown at the glass from above and from below. This method enables high heat-transfer coefficients, necessary when thin glass is concerned in order to achieve a sufficient temperature difference between the surface and center of the glass. Examples of oscillating roller furnaces are disclosed in Fl patents 83,072 and 86,407.

A problem with roller furnaces is that heat transmission from massive rollers to glass is predominant particularly at the initial heating stage. The glass is supported by the rollers all the time, and particularly at the initial heating stage, with the temperature difference between the hot rollers and the glass being considerable, heat transmission from the hot rollers to the glass by conduction is abundant. This makes the edges of the glass bend upwards, the contact surface between the glass and the rollers becoming quite indefinite. In this case, uniform heating of glass is almost impossible as the contact point where the glass touches the roller becomes heated at the initial stage significantly faster than the rest of the glass surface. This easily causes curving, making uniform heating with normal heating times almost impossible. Further, the surface pressure at the point of contact of the glass touching the roller becomes high enough to subject the glass to optical faults, i.e. white marks and scratches, marring the surface of the glass.

Furthermore, the conditions in the furnace change during the heating period in tempering furnaces provided with rollers. The temperature of the glass changes relative to time and, particularly, heat transmission from the rollers diminishes as the temperature of the glass approaches the temperature of the rollers. On the other hand, the temperature of the rollers falls at the initial stage of the heating period when the thermal transfer to the glass is at its highest. This causes the problem of keeping the heating of the upper and lower parts of the furnace balanced during the entire heating period.

Fl patent 62,043 discloses a method and device for preventing the curving of glass sheets in a furnace provided with rollers in a horizontal tempering plant. In accordance with the cited publication, an air current is generated on the upper surface of a glass sheet in order to intensify the convection heat effect directed at the upper surface of the glass sheet. The blowing serves to compensate for the active heat transmission caused by the hot rollers to the lower surface of the glass sheet at the initial heating period, but said blowing does not completely equalize the differences in the heat currents affecting the upper and lower surfaces, as the lower surface of the glass gets a stronger heat current from above, particularly during initial heating, causing the above mentioned problems.

Fl patent 83,072 also discloses a method and a device for preventing the curving of glass sheets in a furnace provided with rollers in a horizontal tempering plant. It is known from said publication to direct an expanded convection heat effect at the upper surface of a glass sheet by blowing air at the furnace from blowpipes disposed in the vicinity of the upper surface of the glass sheet. Said publication further discloses that the furnace space below the glass sheet is cooled by leading the air to be blown into the furnace via heat exchange pipes provided underneath the glass sheet to blowpipes located on the upper side. Said arrangement is, however, quite complex and does not provide control of the equalization of heat in the tempering furnace during the entire heating period.

SUMMARY OF THE INVENTION

It is the object of the present invention to provide a method and equipment for preventing the curving of glass sheets in a tempering furnace provided with rollers, avoiding the above mentioned drawbacks and providing good control of the equalization of heat during the entire heating period.

The method of the invention is characterized in that at the final stage of the heating period the lower surfaces of the glass sheets are heated by forced convection.

The equipment of the invention is characterized in that the equipment comprises means for heating the lower surfaces of the glass sheets by forced convection during the heating period.

It is an essential concept of the invention that, at the initial stage of the heating period, the lower part of the tempering furnace is cooled, and at the final stage of the heating period the lower surfaces of the glass sheets are heated by forced convection. Furthermore, in a preferred embodiment the lower part of the tempering furnace is cooled with cooling pipes arranged in every second roller gap, and the lower surfaces of the glass sheets are heated by forced convection similarly by heating pipes arranged in every second roller gap. In still another preferred embodiment the cooling pipes are provided with holes from which air jets at room temperature are blown at the rollers for cooling the surface temperature of the rollers and the lower part of the furnace. In a third embodiment the cooling is adjusted by changing the speed of the air passing in the pipe.

It is an advantage of the invention that the glass is prevented from curving, resulting in glass with optimal planarity. It is also an advantage that the thermal shock from the rollers to the glass can be reduced at the initial heating stage. It is a further advantage that heat equalization in the tempering furnace can be very well adjusted, and furnace power can be increased.

BRIEF DESCRIPTION OF THE DRAWINGS

The invention will be described in more detail in the attached drawings in which FIG. 1 schematically shows a sectional side view of a horizontal tempering furnace according to the invention.

DETAILED DESCRIPTION

Figure 1:
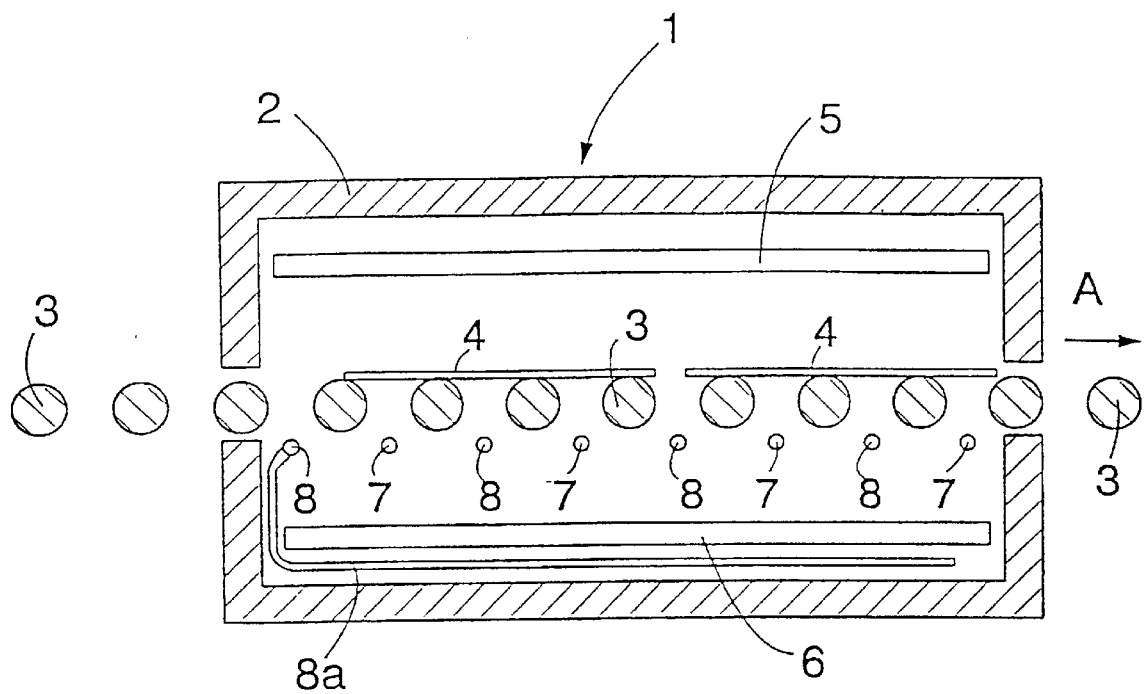

FIG. 1 schematically shows a sectional side view of a horizontal tempering furnace 1 according to the invention. The tempering furnace 1 comprises a housing 2 and rollers 3 upon which glass sheets 4 are placed. During the tempering process, the glass sheets 4 are transferred by means of the rollers 3 in the direction of arrow A. As seen in the Figure, a loading table is arranged on the left side of the tempering furnace 1, and a cooling unit for the glass sheets 4 on the right side of the tempering furnace 1. For the sake of clarity, said loading table and cooling unit are not shown in FIG. 1. The glass sheets 4 are placed on the loading table upon the rollers 3. The rollers 3 are typically ceramic rollers inside the tempering furnace 1 and metal rollers coated with kevlar outside the furnace. The glass sheets 4 are transferred as one load into a heating chamber confined by the housing 2. The glass sheets 4 are typically heated from above with upper resistors 5 and from below with lower resistors 6 in a manner fully known per se. A different manner of heating, such as forced convection or a combination of different heating means, is also feasible. In the furnace, the temperature of the glass is raised to 610 to 625° C. depending on the thickness of the glass.

In the tempering furnace 1, the glass sheets 4 undergo a back-and-forth movement, i.e. are oscillated, in a manner fully known per se, for arranging the roller support points evenly upon the entire glass through the entire heating stage. This is a way to minimize deformations in the glass optics caused by uneven support of the glass.

Cooling pipes 7 are arranged in every second roller gap between the rollers 3 transversely relative to the travel direction of the glass sheet 4. Air at room temperature is typically blown through said cooling pipes 7. The pipe serves as a shadow for heat radiation originating from below the glass and also as means for conducting heat out. Heat is transferred to the pipe by convection from the furnace air surrounding it and by direct radiation from near-by surfaces, such as the ceramic rollers 3 and the lower resistors 6 of the furnace. The heat is conveyed through the pipe from the outer surface of the pipe to its inner surface from which it is conveyed by convection into air with which it is removed. In the invention, the temperature of the outer surface of the cooling pipe 7 is kept, if needed, significantly below the temperature of the tempering furnace 1 by means of air flowing through the cooling pipe 7. The magnitude of the thermal current transferred to the cooling pipe 7 is easily adjustable by adjusting the speed of the air in the cooling pipe 7. The need for cooling changes relative to time, since with the difference in temperature between the glass sheet 4 and the roller 3 becoming smaller, the smaller is the amount of heat to be removed from the tempering furnace 1. This is why the speed of the air is reduced during the entire heating period. The effect of a single cooling pipe 7 can be improved by enlarging the diameter of the pipe or by ribbing it.

Heating pipes 8 are arranged in different roller gaps as compared with the cooling pipes 7, also preferably in every second roller gap. They are provided with machined holes, whereby hot air jets, typically at 650 to 720° C., can be blown from said heating pipe 8 at the lower surface of the glass sheet 4 from between the rollers 3. The diameter of the holes in the heating pipe 8 is typically 1 to 2 mm, but may vary even more from case to case.

The heating pipes 8 are used for heating at the final stage of the heating period when the heating of the glass sheet 4 is typically quite slow, and, in the case of full loads, the ceramic rollers 3 may even start to cool excessively. In these cases, said additional heating at the final stage of the heating period increases the power of the tempering furnace 1. It is obvious that cooling by the cooling pipes 7 and heating by the heating pipes 8 are not employed simultaneously, the system being forced controlled in order to eliminate concomitant operation.

FIG. 1 shows further that the air supplied to the heating pipes 8 arranged between the rollers 3 is led to pass via pipes 8a located below the lower resistors 6. In this way the lower resistors 6 make the air warm up in said pipes 8a. When using heat blowing, the lower resistors 6 are allowed to start to cool, but with said solutions the heat remaining in them may, however, still be utilized for heating the heating air.

Figure 2A:
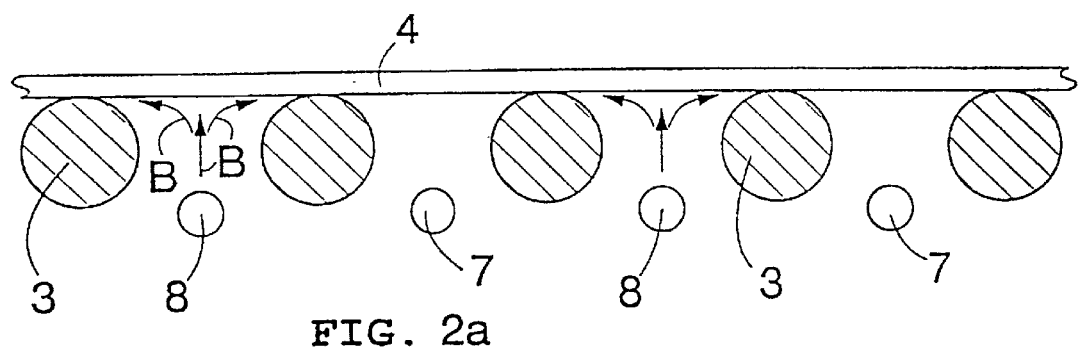
FIGS. 2a and 2b show a sectional side view of a detail of the device of FIG. 1.
Figure 2B:
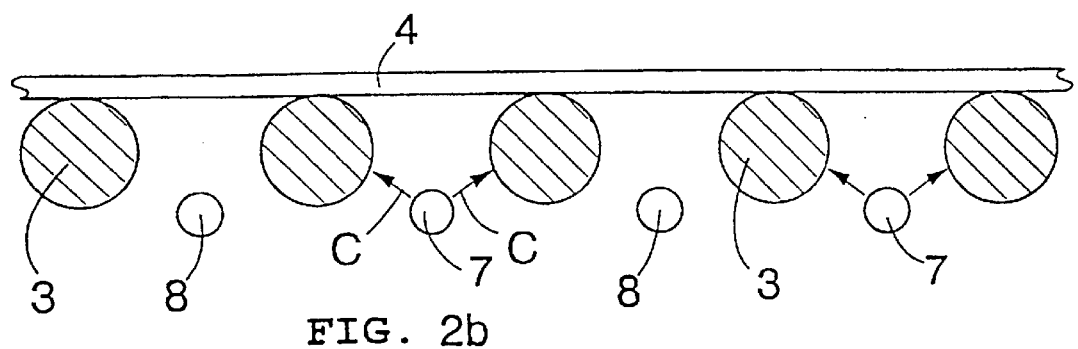

FIGS. 2a and 2b show a sectional side view of a detail of the tempering furnace 1 of FIG. 1. The numbering in FIGS. 2a and 2b corresponds to that of FIG. 1. In FIG. 2a, arrows B show the movement of the air jets blown from the heating pipes 8. If desired, the hot air blown from the heating pipes 8 may also be aimed directly at the rollers 3.

The cooling pipes 7, too, may be used for blowing air directly at the rollers 3 for cooling the rollers 3 and the part of the tempering furnace 1 below the glass sheet 4. Said current of cooling air is illustrated by arrows C in FIG. 2b. The solution according to FIGS. 2a and 2b allow cold air to be blown directly at the rollers 3 at the initial heating stage, whereby the rollers cool down, and hot air to be blown at the final heating stage, whereby the temperature of the rollers 3 may be raised.

Figure 3:
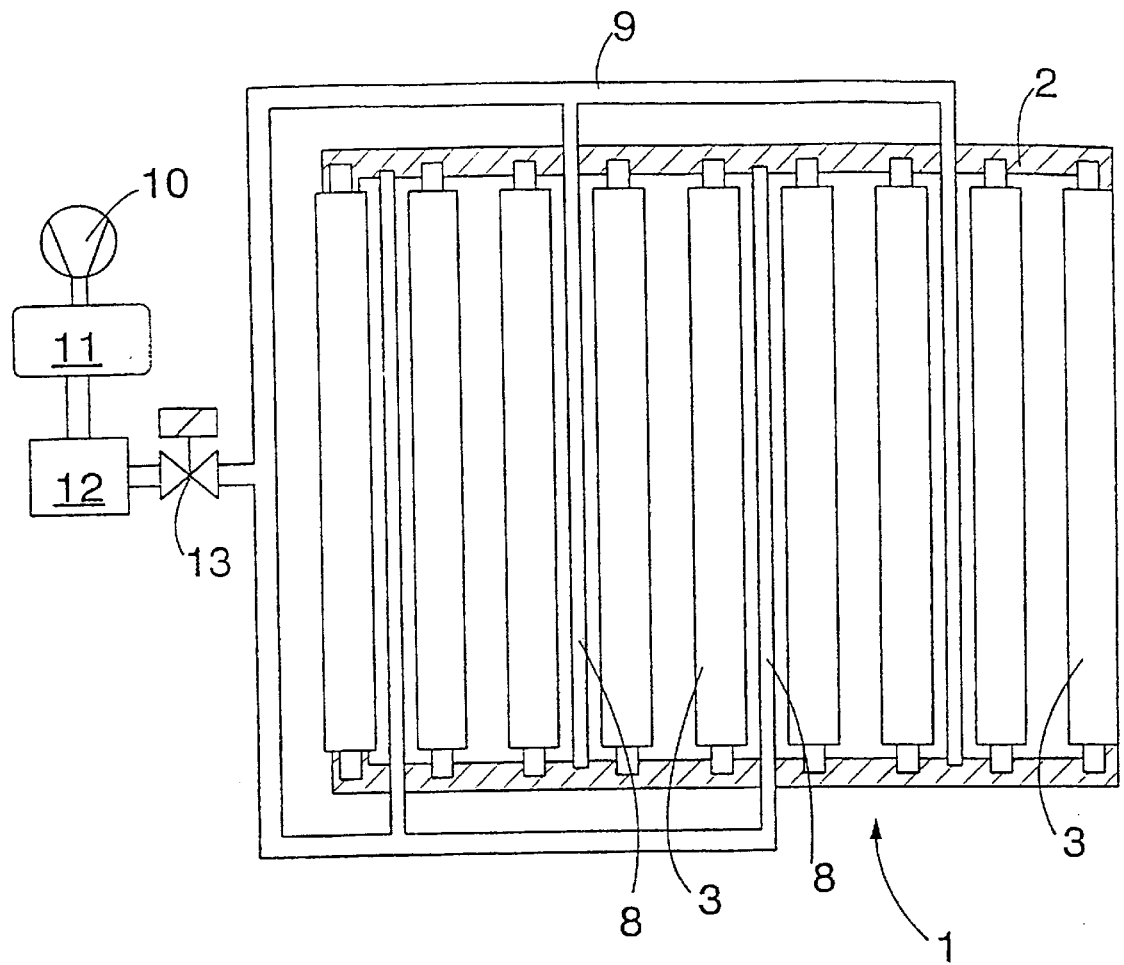
FIG. 3 shows the device of FIG. 1 from below and in section.

FIG. 3 shows the tempering furnace of the invention from below and in section. The numbering in FIG. 3 corresponds to that of FIGS. 1 and 2. FIG. 3 shows the heating pipes 8 arranged in every second roller gap, but for the sake of clarity does not show the cooling pipes 7, also arranged in every second roller gap, but in different gaps than the heating pipes. Hot air is fed to the heating pipes 8 via delivery pipes 9. The heating pipes 8 and the delivery pipes 9 are arranged such that hot air is fed to the heating pipes 8 from both sides of the tempering furnace 1 so that air is fed to every second heating pipe 8 from above as seen in FIG. 3, and to every second from below. This eliminates the impact of the heat inside the tempering furnace 1 on the temperature of the air passing inside the heating pipes 8. Far more important is, however, the temperature of the air passing inside the cooling pipes, and thus said cooling pipes have to be arranged in a corresponding manner, so that cooling air is fed alternately from different sides of the tempering furnace 1. This is an easy way to even out potential unilateral cooling of the rollers 3.

The pressure source of the air blown by the heating pipes 8 may be a compressor 10. After the compressor 10, the air is heated in what is called a heating radiator 11. In the heating radiator 11 the air to be blown is heated in advance to the temperature of the tempering furnace 1, and in some cases even higher. The heating radiator 11 may be a chamber in which a combination of pipes and resistors is provided such that the air blown into the furnace is forced to circulate inside the pipes tens of meters in adjacent spirals. In the immediate vicinity of the pipes, preferably in contact with the pipe, are arranged thermal resistors for warming the pipes and the air inside them to the desired temperature. The heating radiator 11 may also be implemented in some other manner fully known per se, and hence the heating radiator 11 is not described in any more detail here. It is essential that the air blown into the tempering furnace 1 can be heated to the desired temperature and that it does not essentially cool down before the tempering furnace 1. In practice this is implemented by providing the heating radiator 11 and the pipes between the heating radiator 11 and the tempering furnace 1 with proper insulation. Further, in connection with the pipes there is a regulator 12 for adjusting the air flow and thus the magnitude of the desired additional heating. The pipes further comprise a valve 13 which may be a magnetic valve. By means of said valve 13 the air flow can be entirely blocked, if desired.

Similar pipes and devices as shown in FIG. 3 in connection with the heating pipes 8 are arranged in connection with the cooling pipes, except of course for the heating radiator 11.

During a heating period, air at room temperature is blown through the cooling pipes 7 arranged between the rollers 3. The air warms up when being conveyed across the tempering furnace 1 and carries heat away from the tempering furnace 1 and particularly from the rollers 3. The heating of the lower side is entirely or partially switched off. Next the glass load at room temperature is transferred to the tempering furnace 1 where it is oscillated in a reciprocating manner and heated from above and from below. The cooling of the lower side is decreased continuously by lowering the speed of the air passing through the cooling pipes 7. At the same time the heating effect of the lower resistors 6 of the tempering furnace 1 is usually increased. Next, approximately in the middle of the heating period, heating is entirely ceased and direct heating of the lower surface of the glass sheet 4 is initiated by forced convection. Direct heating of the lower surface of the glass sheet 4 is increased gradually towards the end of the heating period and simultaneously the heating effect of the lower resistors 6 is increased. Finally the glass is transferred to the cooling unit and the direct heat blowing of the lower side is switched off and the cooling pipes are switched on.

For the sake of clarity, the attached figures do not show the support structures of the pipes and rollers or the control and rotation means of the rollers, these being known per se to those skilled in the art. Further, for the sake of clarity, the rollers 3, for example, are shown fewer in number and greater in size in relation to their natural actual size.

The drawing and the related description are only intended to illustrate the idea of the invention. As to its details, the invention may vary within the scope of the claims. This means that the cooling pipes and the heating pipes may also be arranged in the same roller gap, and in this case the heating pipe may be arranged above the cooling pipe and fixed to the cooling pipe, for example. In this case the cooling pipes and the heating pipes may be located both in each roller gap.

What is claimed is:

1. A method of heating a glass sheet in a tempering furnace, to temper the glass sheet, said method comprising conveying a glass sheet into the tempering furnace on spaced rollers, heating the glass sheet from above and below during a heating period, oscillating the glass sheet in a reciprocating manner during said heating period, cooling a lower part of the tempering furnace below the glass sheet during the heating period, and heating the glass sheet from below by forced convection during a final stage of the heating period of the glass sheet.

2. A method as claimed in claim 1, wherein the lower part of the furnace is cooled during an initial stage of the heating period.

3. A method as claimed in claim 2, wherein said lower part of the furnace is cooled during the initial stage of the heating period by positioning cooling pipes below and between the spaced rollers.

4. A method as claimed in claim 2, wherein said lower part of the furnace is cooled during the initial stage of the heating period by blowing air through cooling pipes and adjusting the cooling by regulating a speed of flow of the air in the cooling pipes.

5. A method as claimed in claim 1, wherein the lower part of the furnace is cooled by blowing air through cooling pipes which extend transversely across the tempering furnace, and controlling flow of the cooling air through the pipes so that the air flows in opposite directions from opposite sides of the furnace in alternate cooling pipes.

6. A method as claimed in claim 4, wherein the cooling pipes are provided with holes through which jets of air are blown at the rollers for cooling the rollers as well as the lower part of the tempering furnace.

7. A method as claimed in claim 1, wherein the heating of the glass sheet by convection is effected by blowing heating air from heating pipes disposed in the lower part of the tempering furnace.

8. A method as claimed in claim 7, wherein said heating pipes extend transversely across the tempering furnace, the heating air flowing in opposite directions from opposite sides of the furnace in alternate heating pipes.

9. A method as claimed in claim 8, comprising blowing the heating air at a lower surface of the glass sheet.

10. A method as claimed in claim 9, wherein the heating air is blown from the heating pipes at a temperature of 650 to 720° C.

11. Apparatus for tempering a glass sheet, said apparatus comprising a tempering furnace, a plurality of horizontal, spaced rollers in said furnace for supporting a glass sheet horizontally in the furnace and form a conveyor for the glass sheet, means in the furnace for heating the glass sheet from above and below, said rollers being adapted to oscillate the sheet in a reciprocal manner during a heating period in the furnace, means for cooling a lower part of the furnace below the glass sheet during said heating period and means for heating a lower surface of the glass sheet by forced convection during the heating period.

12. Apparatus as claimed in claim 11, wherein said means for heating comprises means for producing forced air convection during a final stage of the heating period.

13. Apparatus as claimed in claim 11, wherein said means for cooling comprises cooling pipes disposed in every second gap between adjacent spaced rollers, and means for blowing air through said cooling pipes.

14. Apparatus as claimed in claim 13, wherein said means for heating comprises heating pipes disposed in every second roller gap in alternation with said cooling pipes.

15. Apparatus as claimed in claim 14, wherein said heating pipes face the lower surface of said glass sheet and have openings for directing heating air against said lower surface of said glass sheet.

16. Apparatus as claimed in claim 13, wherein the tempering furnace has opposite sides, said cooing air flowing from opposite sides of the furnace in opposite directions in alternate cooling pipes.

17. Apparatus as claimed in claim 16, wherein said cooling pipes are provided with holes facing said rollers for blowing cooling air from each cooling pipe against two adjacent said rollers.

18. Apparatus as claimed in claim 13, comprising means for adjusting speed of flow of the cooling air in the cooling pipes.

* * * * *